United States Patent
Takatsu et al.

(10) Patent No.: US 12,216,574 B2
(45) Date of Patent: Feb. 4, 2025

(54) STORAGE SYSTEM AND PROCESSING METHOD OF STORAGE SYSTEM FOR MANAGING STATUS OF RANGES OF LOGICAL ADDRESS

(71) Applicant: Kioxia Corporation, Tokyo (JP)

(72) Inventors: Hiroyuki Takatsu, Tokyo (JP); Takeshi Tanaka, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 210 days.

(21) Appl. No.: 17/941,391

(22) Filed: Sep. 9, 2022

(65) Prior Publication Data

US 2023/0305955 A1 Sep. 28, 2023

(30) Foreign Application Priority Data

Mar. 22, 2022 (JP) ................. 2022-045556

(51) Int. Cl.
*G06F 12/02* (2006.01)

(52) U.S. Cl.
CPC ...... *G06F 12/0292* (2013.01); *G06F 12/0246* (2013.01); *G06F 2212/1024* (2013.01); *G06F 2212/2022* (2013.01)

(58) Field of Classification Search
CPC ............ G06F 12/0292; G06F 12/0246; G06F 2212/1024; G06F 2212/2022
See application file for complete search history.

(56) References Cited

U.S. PATENT DOCUMENTS

| | | | |
|---|---|---|---|
| 7,296,139 B1 * | 11/2007 | Case | G06F 12/0897 711/E12.043 |
| 11,144,448 B2 | 10/2021 | Gyllenskog | |
| 11,232,022 B2 * | 1/2022 | Jeong | G06F 3/0659 |
| 2007/0073994 A1 * | 3/2007 | Zohar | G06F 3/0613 711/163 |
| 2020/0349086 A1 | 11/2020 | Gerhart et al. | |
| 2021/0042232 A1 | 2/2021 | Park et al. | |

* cited by examiner

*Primary Examiner* — Eric T Loonan
(74) *Attorney, Agent, or Firm* — Maier & Maier, PLLC

(57) ABSTRACT

According to one embodiment, a storage system including a volatile memory with a first area, a second area, and a third area. The first area stores a logical address specified by an external device, a physical address of a nonvolatile storage medium associated with the logical address, and first information related to association between the logical address and the physical address. The second area stores a first number of second information indicating states of the first number of first ranges of the logical address. The third area stores third information indicating a state of a second range of the logical address, which includes the first number of the first ranges.

20 Claims, 14 Drawing Sheets

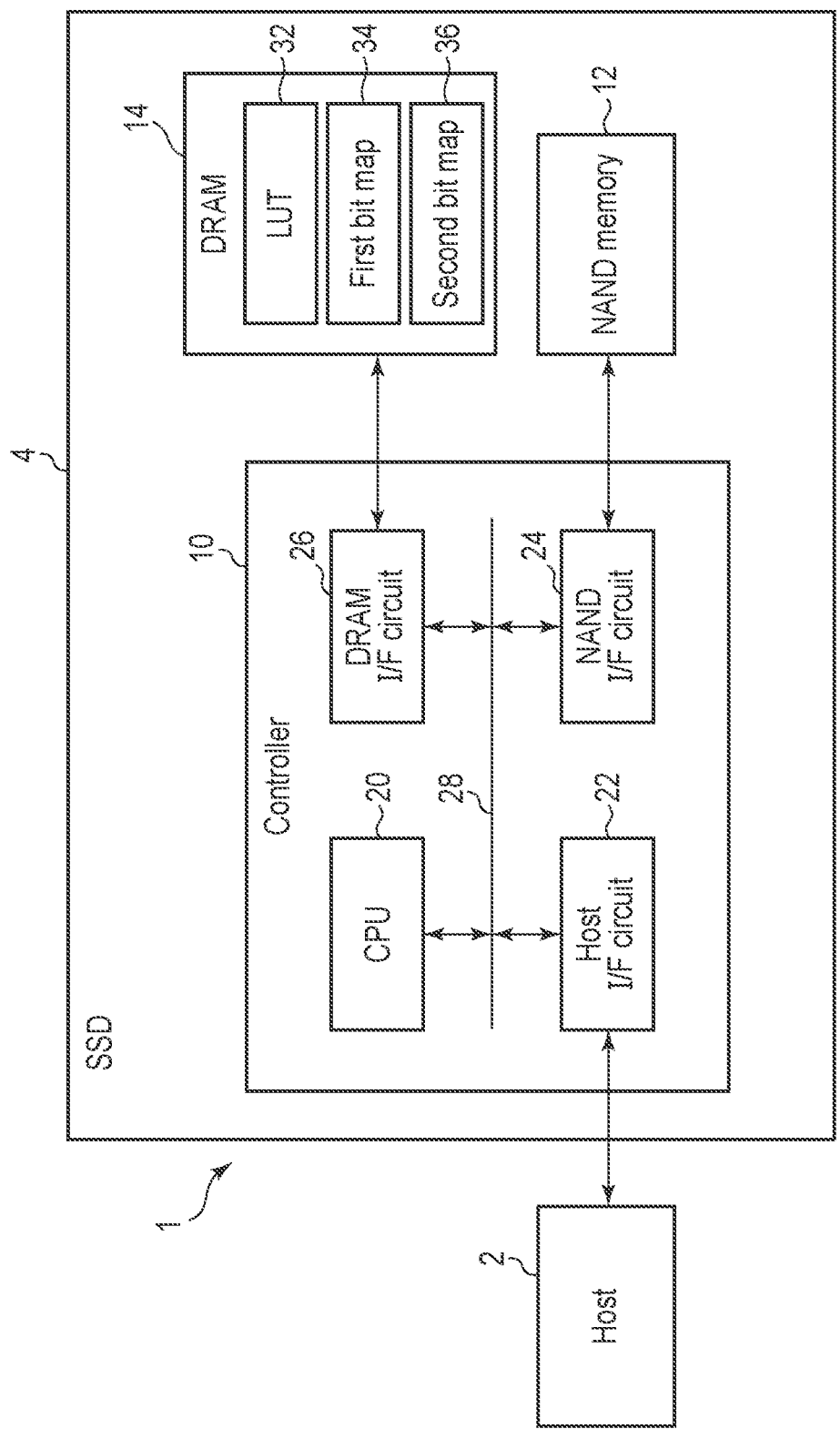
F I G. 1

| LBA | Physical address | Unmap flag |
|---|---|---|
| 0x000 | PBA0 | 0 |
| 0x001 | PBA8 | 0 |
| 0x002 | Null | 1 |
| 0x003 | PBA4 | 0 |
| 0x004 | PBA2 | 0 |
| 0x005 | PBA1 | 1 |
| 0x006 | Null | 1 |
| 0x007 | PBA3 | 0 |
| 0x008 | Null | 1 |
| ... | ... | ... |

FIG. 2

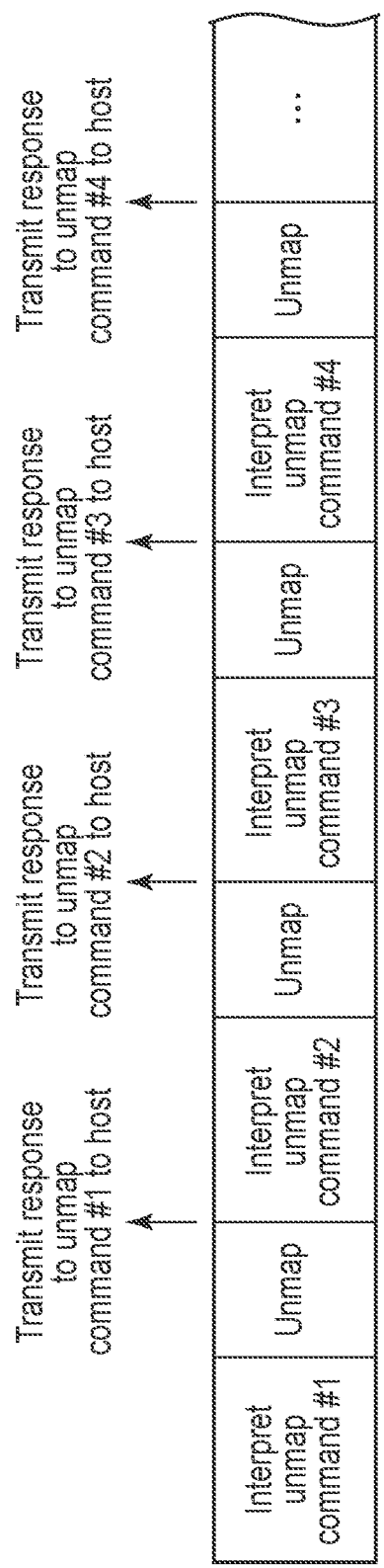
F I G. 3

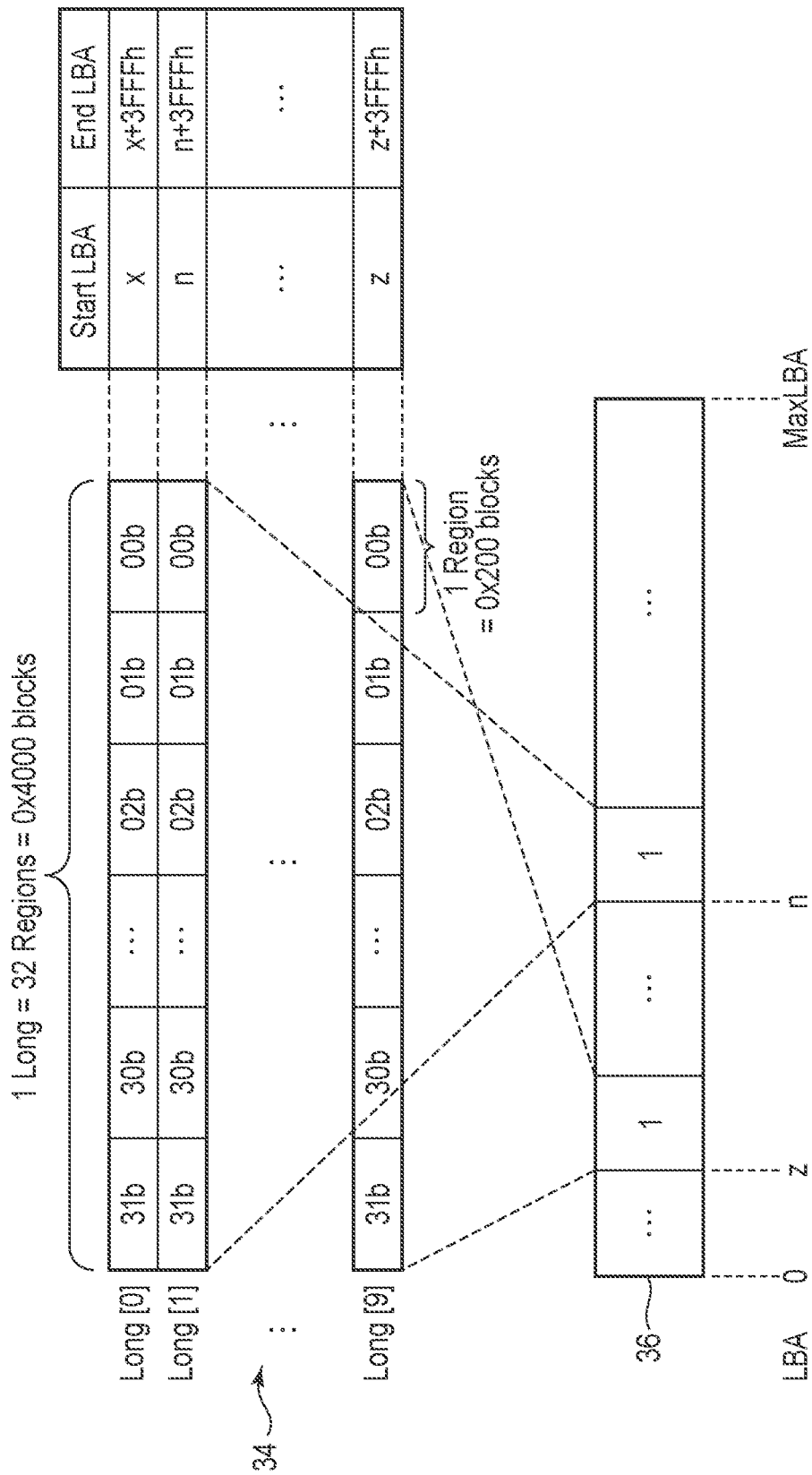
F I G. 5

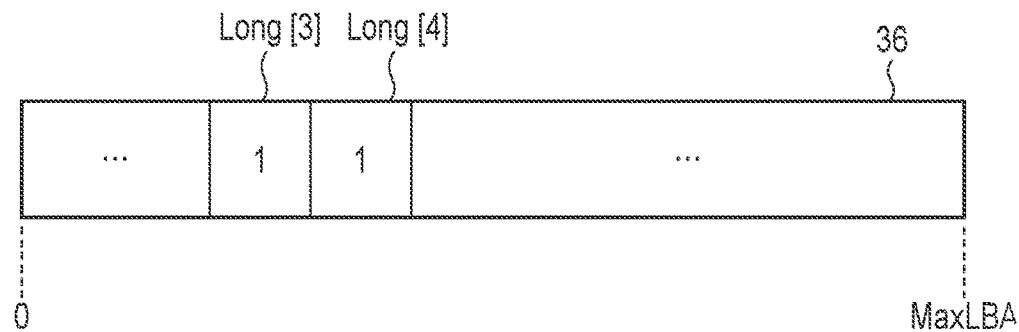
F I G. 9
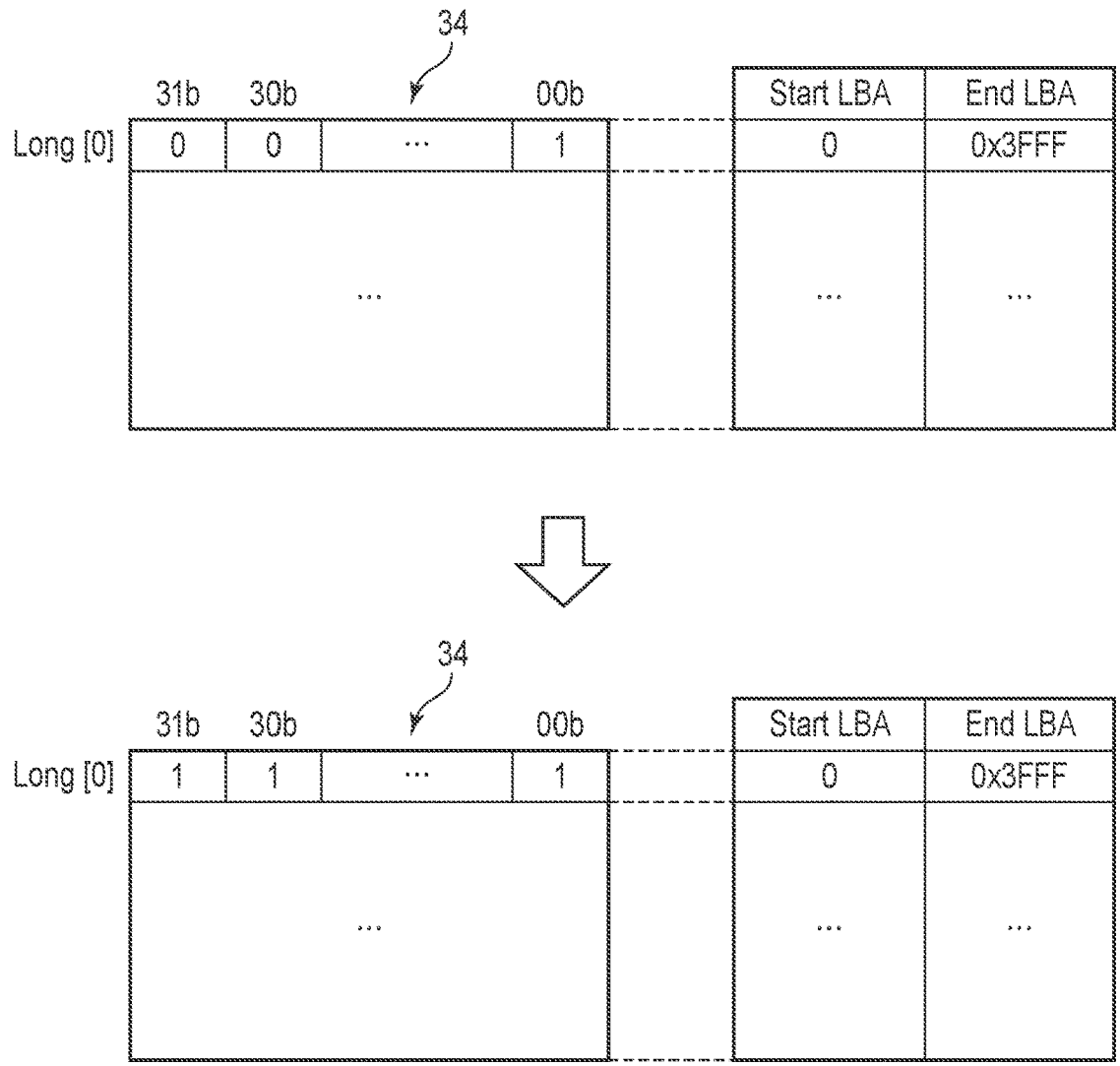
F I G. 10

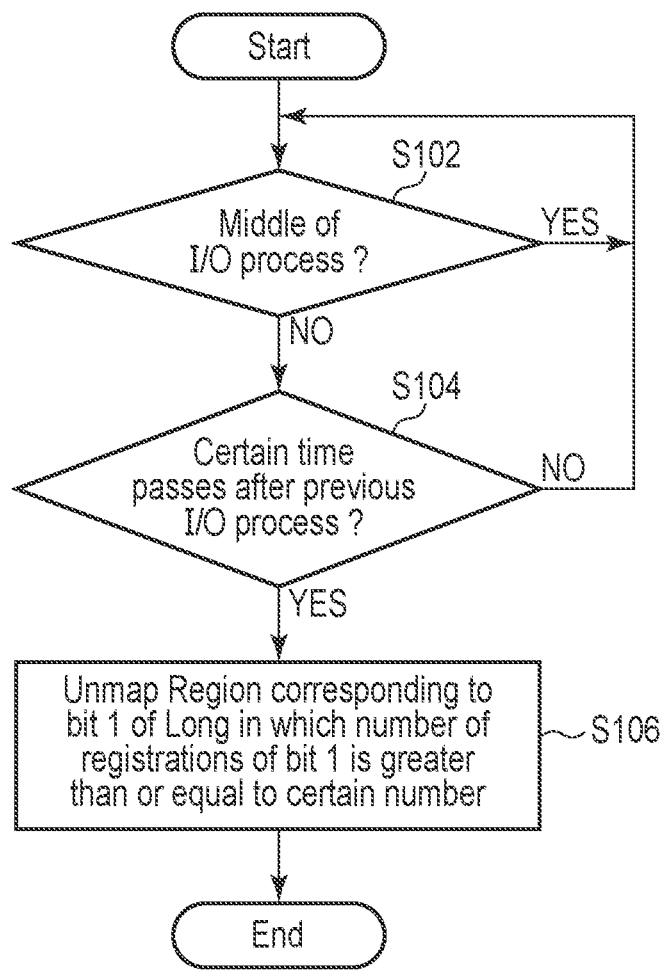
F I G. 15

STORAGE SYSTEM AND PROCESSING METHOD OF STORAGE SYSTEM FOR MANAGING STATUS OF RANGES OF LOGICAL ADDRESS

CROSS-REFERENCE TO RELATED APPLICATIONS

This application is based upon and claims the benefit of priority from Japanese Patent Application No. 2022-045556, filed Mar. 22, 2022, the entire contents of which are incorporated herein by reference.

FIELD

Embodiments described herein relate generally to a storage system and a processing method of a storage system.

BACKGROUND

As an example of a storage system including a nonvolatile storage medium, a solid state drive (SSD) is known. A storage system updates an address translation table when the storage system receives a write command specifying a logical address from a host and writes corresponding data. The address translation table associates a physical address of a nonvolatile memory with the logical address. Data corresponding to the logical address specified from the host is stored in a physical address of the nonvolatile memory. To associate a physical address with a logical address is referred to as mapping. To invalidate the association of a physical address with a logical address may be referred to as unmap. It is not able to read data corresponding to a logical address with which no physical address is associated.

A command for making reading of data of the storage system disable may be an unmap command or a trim command. In this specification, the term "unmap command" is used as a generic term for an unmap command and a trim command. The host transmits an unmap command specifying a logical address for unmapping to the storage system.

The storage system invalidates the association of the physical address with the logical address specified by the unmap command by updating the address translation table. A process of updating the address translation table takes time in proportion to the range of the logical addresses to be unmapped. Until the host receives a response to the unmap command from the storage system after transmitting the unmap command, the host cannot transmit another command such as a host read command or a host write command to the storage system. Thus, when the time required for unmapping is long, the period in which the storage system cannot read or write data is also long.

BRIEF DESCRIPTION OF THE DRAWINGS

FIG. 1 is a block diagram showing an example of an information processing system 1 according to an embodiment.

FIG. 2 shows an example of an address translation table according to the embodiment.

FIG. 3 is a diagram for explaining a first unmap according to the embodiment.

FIG. 5 is a diagram for explaining a first bit map and a second bit map according to the embodiment.

FIG. 9 shows an example of the second bit map according to the embodiment.

FIG. 10 shows an example of changing of the first bit map according to the embodiment.

FIG. 15 illustrates a flowchart showing an example of an unmap by a controller according to a modification.

DETAILED DESCRIPTION

Figure 4:
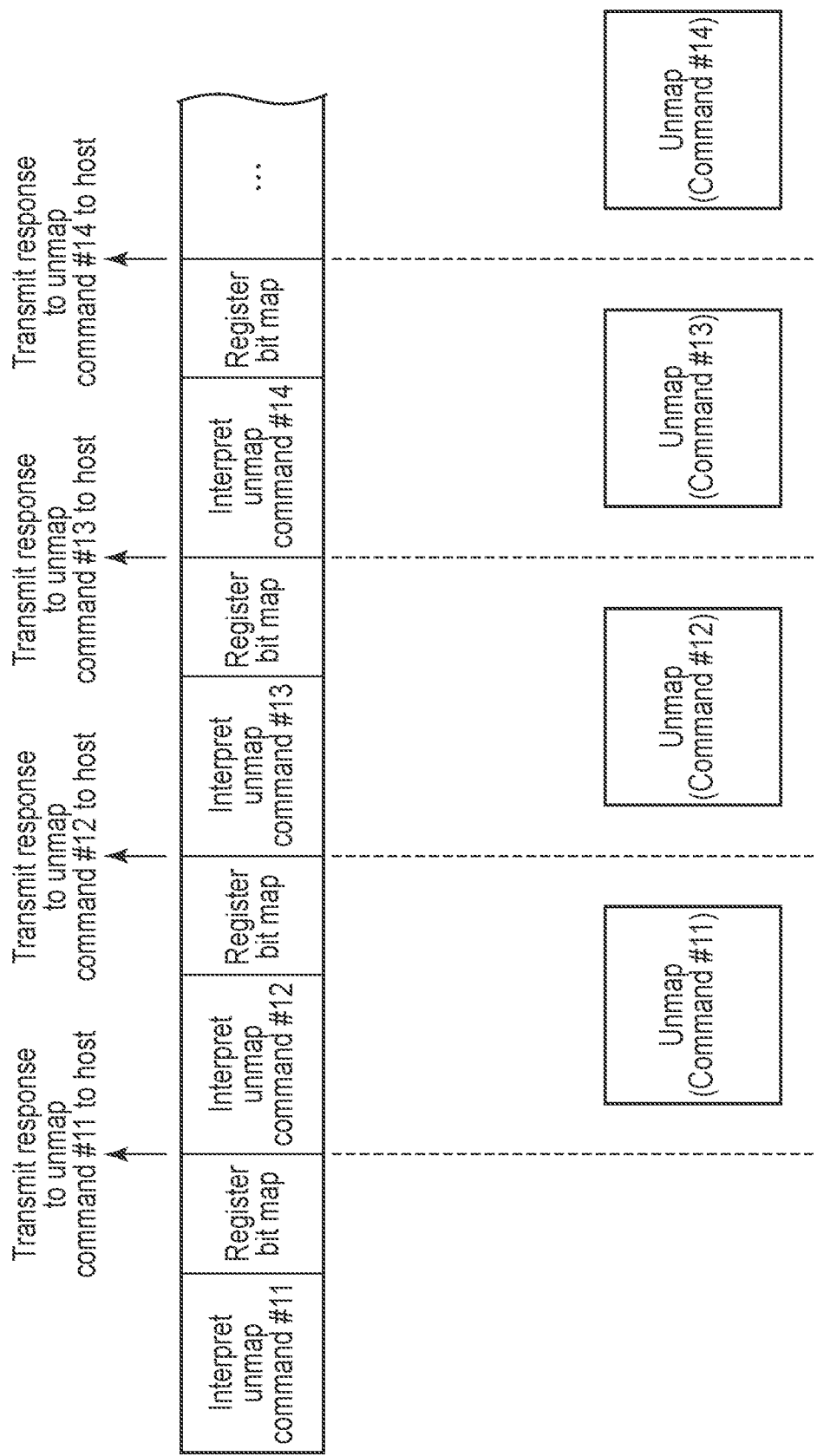
FIG. 4 is a diagram for explaining a second unmap according to the embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a storage system comprising a nonvolatile storage medium; a volatile memory; and a controller. The volatile memory comprises a first area; a second area; and a third area. The first area is configured to store a logical address specified by an external device, a physical address of the nonvolatile storage medium associated with the logical address, and first information related to association between the logical address and the physical address. The second area is configured to store a first number of second information indicating states of the first number of first ranges of the logical address. The third area is configured to store third information indicating a state of a second range of the logical address, the second range including the first number of the first ranges. The value of the first information is a first value when the physical address is associated with the logical address. The value of the first information is a second value different from the first value when the physical address is not associated with the logical address. The controller is configured to write third information to the third area based on the first number of the second information. The controller is configured to change the value of the first information related to the second range of the logical address to the second value based on the third information.

FIG. 1 is a block diagram showing an example of an information processing system 1 according to an embodiment. The information processing system 1 includes a storage system 4 and a host 2. The host 2 is connectable to the storage system 4. The storage system 4 is a storage device configured to write data to a nonvolatile storage medium or read data from the nonvolatile storage medium. The storage system 4 is an example of a memory system and is, for example, an SSD. Hereinafter, the storage system 4 may be referred to as the SSD 4. The nonvolatile storage medium is, for example, a NAND flash memory, a NOR flash memory, a Magnetoresistive Random Access Memory (MRAM), a Phase-change Random Access Memory (PRAM), a Resistive Random Access Memory (ReRAM), or a Ferroelectric Random Access Memory (FeRAM). Hereinafter, this specification explains the storage system 4 including a NAND memory 12 as the nonvolatile storage medium. The storage system 4 may be a UFS device or a memory card.

The host 2 is an information processing device as an external device which accesses the SSD 4. The host 2 may be a server (Storage server) which writes a large amount of and various types of data to the SSD 4. The host 2 may be a personal computer. The SSD 4 may be incorporated into the server of a data center, etc., for business use. The SSD 4 may be incorporated into a personal computer for personal use.

The SSD 4 includes a controller 10, the NAND memory 12, and a Dynamic Random Access Memory (DRAM) 14. The SSD 4 could be used as the main storage of the host 2. The SSD 4 may be incorporated into the host 2 or may be provided outside the host 2 and connected to the host 2 via a cable or network.

The controller 10 writes data to the NAND memory 12 or reads data from the NAND memory 12 in accordance with a command (request) transmitted from the host 2. The controller 10 could be a circuit such as a System-on-a-Chip (SoC).

The DRAM 14 is an example of a volatile memory. The DRAM 14 is, for example, a DRAM of the Double Data Rate 3 Low-voltage (DDR3L) standard. The DRAM 14 operates as a buffer memory for storing data which has been supplied from the host 2 to the SSD 4 and is in the middle of writing or has not been written to the NAND memory 12 and data which has been read from the NAND memory 12 and is in the middle of transfer or has not been transferred to the host 2. The DRAM 14 includes an area for storing an address translation table (hereinafter, referred to as a lookup table: LUT) 32, an area for storing a first bit map 34, and an area for storing a second bit map 36. The LUT 32 defines the association between a logical address specified by the host 2 and a physical address of the NAND memory 12. The first bit map 34 and second bit map 36 are used for unmapping. In addition to these areas, the DRAM 14 includes a command buffer, a write buffer, and a read buffer. The command buffer stores a command received from the host 2. The write buffer stores data which is in the middle of writing or has not been written to the NAND memory 12. The read buffer stores data which has been read from the NAND memory 12 and is in the middle of transfer or has not been transferred to the host 2.

The DRAM 14 as a volatile memory may not be provided outside the controller 10 and may be provided inside the controller 10. As a volatile memory, instead of the DRAM 14, a Static Random Access Memory (SRAM) which can perform faster access may be used.

The NAND memory 12 may include a plurality of NAND chips. Each NAND chip may include a memory cell array including a plurality of memory cells arrayed in matrix. Each NAND chip may be a chip which includes a memory cell array in a two-dimensional structure or may be a chip which includes a memory cell array in a three-dimensional structure.

The controller 10 includes a CPU 20, a host interface circuit (host I/F circuit) 22, a NAND interface circuit (NAND I/F circuit) 24, and a DRAM interface circuit (DRAM I/F circuit) 26. The CPU 20, the host I/F circuit 22, the NAND I/F circuit 24, and the DRAM I/F circuit 26 are connected to a bus line 28.

For example, the CPU 20 executes a firmware stored in the NAND memory 12 and realizes various functions. The various functions include, for example, the execution of a command from the host 2. The command is, for example, a host read command, a host write command, or an unmap command.

The host I/F circuit 22 is electrically connected to the host 2. The NAND I/F circuit 24 is electrically connected to the NAND memory 12. The DRAM I/F circuit 26 is electrically connected to the DRAM 14.

The host I/F circuit 22 conforms with standards such as Small Computer System Interface (SCSI), Serial Attached SCSI (SAS), AT Attachment (ATA), Serial ATA (SATA), PCI Express (PCIe)™, Ethernet™, Fibre Channel™, NVM Express (NVMe)™, Universal Serial Bus (USB)™, and Universal Asynchronous Receiver/Transmitter (UART)™.

The NAND I/F circuit 24 conforms to standards such as Toggle, DDR, and Open NAND Flash Interface (ONFI).

FIG. 2 shows an example of the LUT 32 according to the embodiment. The LUT 32 stores logical addresses, physical addresses associated with the logical addresses, and unmap flags. Each logical address is an address used by the host 2 to specify an address in the logical address space of the SSD 4. Each logical address is, for example, a logical block address (LBA) indicating an address of a logical block managed by the host 2. The size of each logical block is, for example, 512 K. Hereinafter, each logical address may be referred to as an LBA. Each physical address indicates a physical storage location of the NAND memory 12. Each unmap flag indicates whether or not a physical address is associated with an LBA. An unmap flag with a value 0 indicates that a physical address is associated with an LBA, in other words, the association between an LBA and a physical address is valid (mapped state). An unmap flag with a value 1 indicates that no physical address is associated with an LBA, in other words, the association between an LBA and a physical address is invalid (unmapped state).

FIG. 2 shows that physical addresses PBA0, PBA8, PBA4, PBA2, and PBA3 are associated with LBAs 0x000, 0x001, 0x003, 0x004, and 0x007, respectively. Physical address PBA1 is described so as to correspond to LBA 0x005. However, since the value of the unmap flag of LBA 0x005 is 1, the association between LBA 0x005 and physical address PBA1 is invalid.

When data corresponding to an LBA is not stored in the NAND memory 12, invalid data (Null) is associated with the LBA. The value of the unmap flag of an LBA with which Null is associated is 1.

When the controller 10 receives a write command specifying a write start LBA, and write data from the host 2, the controller 10 writes the write data to the NAND memory 12 at a physical storage location, updates the LUT 32, associates a physical address indicating the physical storage location with the write start LBA and changes the value of the unmap flag to 0. A physical address associated with an LBA indicates the latest physical write starting location of the NAND memory 12 to which data corresponding to the LBA has been written.

When the controller 10 receives a read command specifying a read start LBA and a read block number from the host 2, the controller 10 reads the physical address associated with the read start LBA from the LUT 32 and reads data from the physical address of the NAND memory 12 read from the LUT 32.

When the value of the unmap flag of the LBA is 1, no physical address is associated with the LBA. Therefore, it is not able to read data corresponding to the LBA.

The LUT 32 is nonvolatilized when it is written to the NAND memory 12 at the time of the shutdown of the SSD 4. The LUT 32 may be loaded from the NAND memory 12 into the DRAM 14 when the SSD 4 is turned on.

When the controller 10 receives an unmap command from the host 2, the controller 10 performs unmap and disables the reading of the data specified by an LBA for which the unmap has been performed. Unmap includes changing of the value of an unmap flag in the LUT 32 to 1. Thus, unmap includes invalidation of the association between a logical address and a physical address.

The controller 10 can selectively perform first unmap or second unmap as unmap. An unmap command transmitted by the host 2 to the SSD 4 includes a command ID indicating unmap, the start LBA of an LBA range for unmapping, and an unmap size (the number of LBAs). The LBA range for unmapping may be referred to as an unmap range. The controller 10 selects the first unmap or the second unmap based on the unmap size. The unmap size which is the criterion for the selection of the first unmap and the second unmap is indicated by "Long". One Long corresponds to 32 Regions. One "Region" corresponds to 0x200 (512 in a decimal number) logical blocks (hereinafter, simply referred to as blocks). Thus, one Long corresponds to 0x4000 blocks.

The controller 10 interprets an unmap command and obtains an unmap range and an unmap size. When the unmap size is less than one Long, the controller 10 performs the first unmap. When the unmap size is greater than or equal to one Long, the controller 10 performs the second unmap.

FIG. 3 is a diagram for explaining the first unmap according to the embodiment. It is assumed that the host 2 successively transmits a plurality of unmap commands #1, #2, #3, and #4 to the SSD 4. The controller 10 successively receives the unmap commands #1, #2, #3, and #4 and temporarily writes the received commands to the command buffer in the DRAM 14.

The controller 10 interprets the unmap command #1 and obtains the unmap range and the unmap size. At this time, the unmap size is less than one Long.

The controller 10 performs unmap by changing the value of the unmap flag of the unmap range in the LUT 32 to 1.

After performing the unmap, the controller 10 transmits a response to the unmap command #1 to the host 2.

Subsequently, in a manner similar to that of the above descriptions, the controller 10 interprets the unmap commands #2, #3, and #4, obtains the unmap ranges and the unmap sizes, and performs unmaps by changing the values of the unmap flags of the unmap ranges in the LUT 32 to 1, respectively.

After completing the unmap for each of the unmap commands #2, #3, and #4, the controller 10 transmits responses to the unmap commands to the host 2.

Until the host 2 receives a response to an unmap command, the host 2 cannot transmit another command. The unmap size of the first unmap is less than one Long and is thus, a narrow range. However, when a large number of unmap commands in which the unmap sizes are less than one Long are issued by normal Linux™ commands such as Blkdiscard, it may take tens of minutes to complete the first unmap for the unmap commands.

FIG. 4 is a diagram for explaining the second unmap according to the embodiment. Here, similarly, it is assumed that the host 2 successively transmits a plurality of unmap commands #11, #12, #13, and #14 to the SSD 4. The controller 10 successively receives the unmap commands #11, #12, #13, and #14 and temporarily writes the received commands to the command buffer.

The controller 10 interprets the unmap command #11 and obtains the unmap range and the unmap size. At this time, the unmap size is greater than or equal to one Long.

In the second unmap, after interpreting an unmap command, the controller 10 does not immediately perform unmap, and writes information indicating the state of the unmap range to the first bit map 34 or the second bit map 36. The information indicating the state of the unmap range indicates which LBA range should be unmapped. To write information indicating the state of an unmap range to the first bit map 34 or the second bit map 36 may be referred to as registration.

After registering information indicating the state of the unmap range to the first bit map 34 or the second bit map 36, the controller 10 transmits a response to the unmap command #11 to the host 2.

Subsequently, in a manner similar to that of the above descriptions, the controller 10 interprets the unmap commands #12, #13, and #14, obtains the unmap ranges and the unmap sizes, and registers information indicating the state of the unmap range regarding each of the unmap commands #12, #13, and #14 to the first bit map 34 or the second bit map 36.

The controller 10 transmits a response to each unmap command to the host 2 after registering information indicating the state of the unmap range to the first bit map 34 or the second bit map 36 regarding each command. In the second unmap, since a response to an unmap command is transmitted to the host 2 before the performing unmap, the response could be transmitted to the host 2 earlier than the case of the first unmap.

After registering the information indicating the state of the unmap range to the first bit map 34 or the second bit map 36, the controller 10 refers to the first bit map 34 or the second bit map 36 and performs unmap at the time the controller 10 does not perform an I/O process based on a request from the host 2. In FIG. 4, unmap seems to be synchronized with a process regarding another unmap command. However, the configuration is not limited to this figure.

FIG. 5 is a diagram for explaining the first bit map 34 and the second bit map 36 according to the embodiment.

The second bit map 36 includes bits equal to the total number of longs included in the entire range (from 0 to MaxLBA) of the LBAs managed by the host 2. In other words, in the second bit map 36, one bit corresponds to an LBA range of one Long. The value of each bit of the second bit map 36 indicates whether or not a corresponding Long is the target for unmapping. An initial value of each bit of the second bit map 36 is 0. A bit having the value of 0 is referred to as bit 0. A bit having the value of 1 is referred to as bit 1. In the second bit map 36, bit 1 indicates that a corresponding Long is the target for unmapping. In the second bit map 36, bit 0 indicates that a corresponding Long is not the target for unmapping.

When the controller 10 receives an unmap command and the unmap size of the received unmap command is greater than or equal to one Long, the controller 10 changes the value of a corresponding bit in the second bit map 36 to 1 for a Long in the unmap range. In the LUT 32, the controller 10 sets the value of the unmap flag of the LBA range of a Long corresponding to bit 1 of the second bit map 36.

The first bit map 34 includes 10 subareas called Long [0], Long [1] .... Long [9]. Long [i] stores data of 32 bits, where i is equal to 0 to 9. The 32 bits of Long [i] correspond to successive 32 Regions corresponding to Long [i], respectively. Each bit of Long [i] indicates whether or not a corresponding Region is the target for unmapping. The initial value of each bit of Long [i] is 0. In Long [i], bit 1 indicates that a corresponding Region is the target for unmapping. In Long [i], bit 0 indicates that a corresponding Region is not the target for unmapping.

When the controller 10 receives an unmap command and the unmap size of the received unmap command is less than one Long and greater than or equal to one Region, the controller 10 sets the value of a bit of Long [i] in the first bit map 34 to 1 for a Region of the unmap range.

Long [i] is associated with an LBA range determined by a start LBA and an end LBA. The start LBA of Long [i] is a start LBA of the Region having the minimum LBA in the 32 Regions included in Long [i]. The end LBA is a start LBA of the Region having the maximum LBA in the 32 Regions included in Long [i]. The LBA ranges of 32 Regions corresponding to Long [i] need to be successive. However, the LBA ranges of Long [i] and Long [i+1] or Long [i−1] may not be successive.

In the initial state of the first bit map 34, Long [i] is not associated with any LBA range. When a Region which is the target for unmapping is registered to Long [i] with which no LBA range is associated (in other words, when the value of a bit corresponding to a Region which is the target for unmapping is changed to 1), the LBA range of 32 Regions (one Long) including the Region which is the target for unmapping is associated with Long [i]. For example, Long [0] is associated with the LBA range from x to x+3FFFFh. Long [1] is associated with the LBA range from n to n+3FFFFh. Long [9] is associated with the LBA range from z to z+3FFFFh. A Region which is the target for unmapping is associated with an arbitrary bit of the 32 bits of a Long. A Region which is the target for unmapping can be associated with bit 31*b*, bit 00*b*, or an arbitrary intermediate bit of Long [i].

When all of the values of the 32 bits of Long [i] are 1, the controller 10 sets the value of a bit of the second bit map 36 corresponding to Long [i] to be 1. In the first bit map 34, the controller 10 changes all of the values of the 32 bits of Long [i] to 0, and invalidates the start LBA and the end LBA of Long [i] (in other words, to be in an undefined state).

Figure 6:
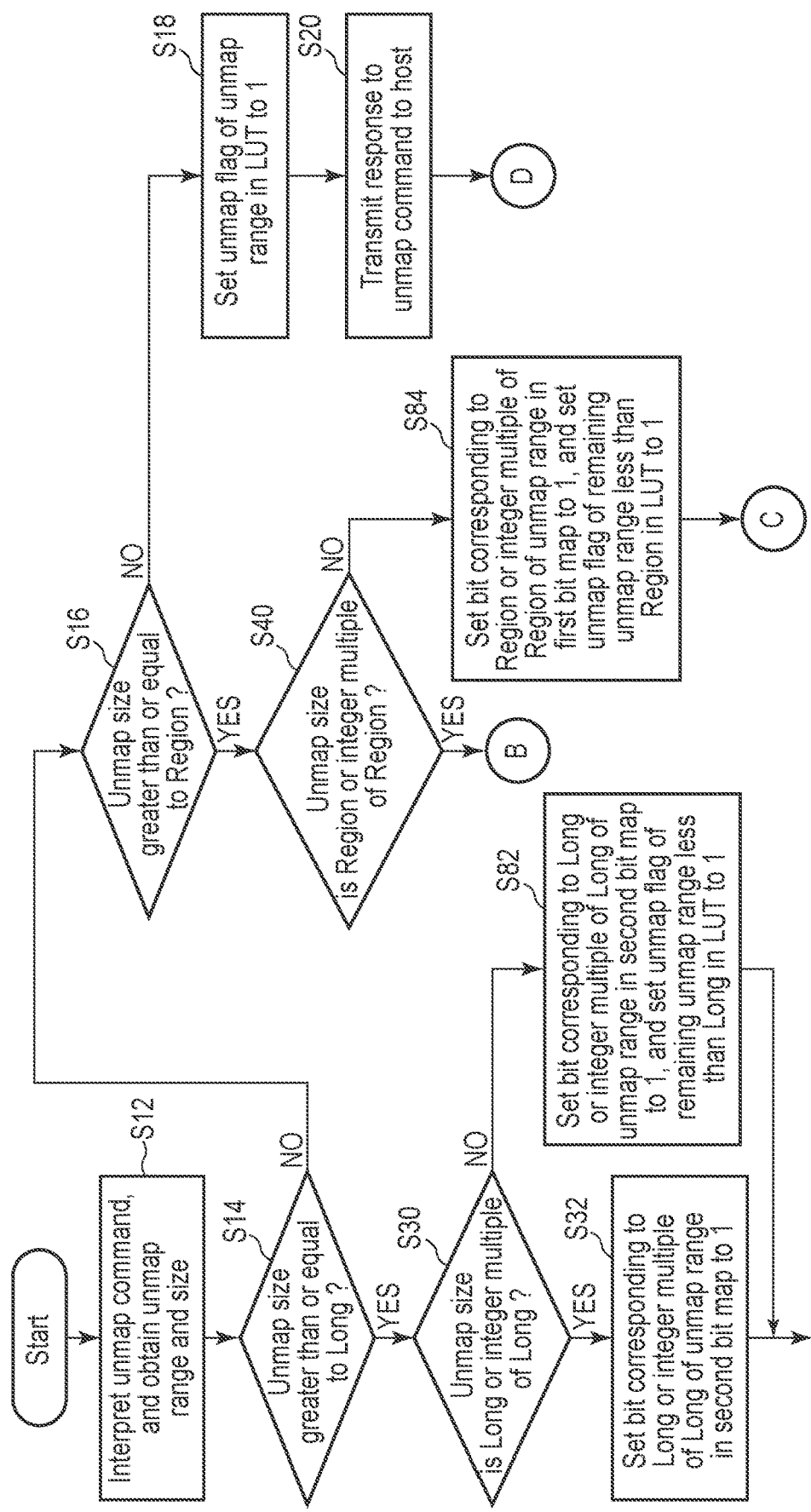
FIG. 6 illustrates a flowchart showing part of an example of an unmap by a controller according to the embodiment.
Figure 7:
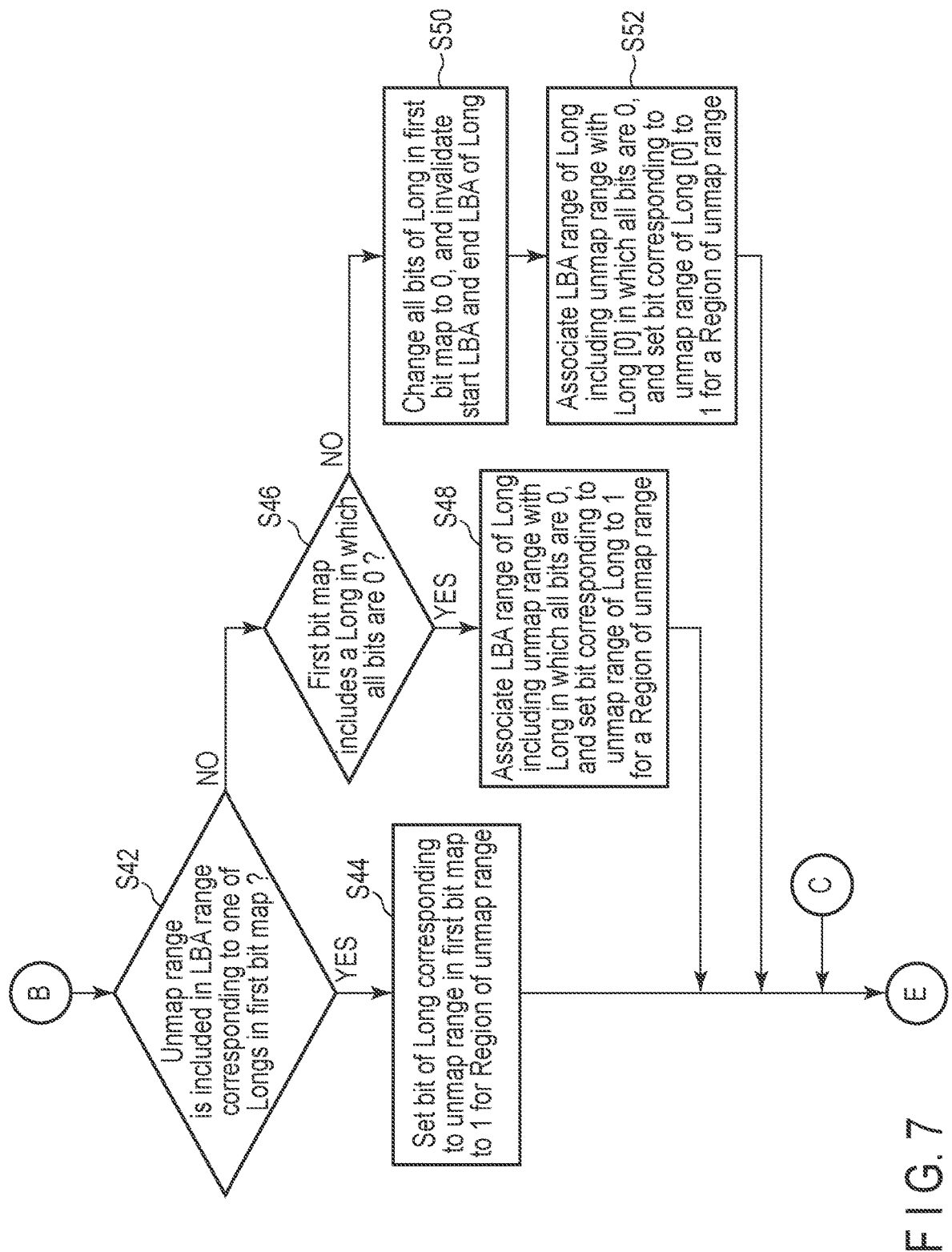
FIG. 7 illustrates a flowchart showing another part of the example of the unmap by the controller according to the embodiment.
Figure 8:
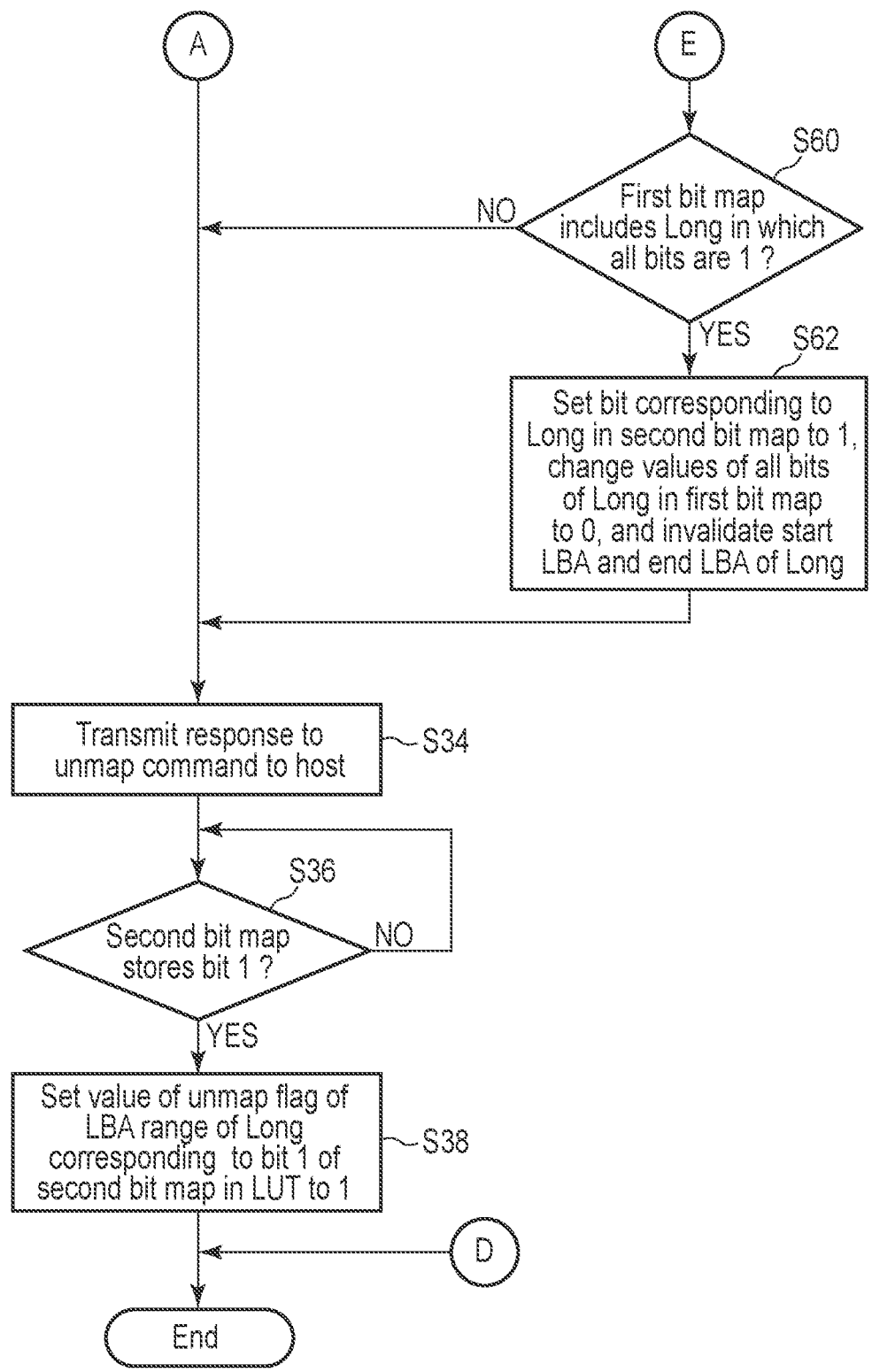
FIG. 8 illustrates a flowchart showing still another part of an example of the unmap by the controller according to the embodiment.

FIG. 6, FIG. 7, and FIG. 8 each illustrates a part of a flowchart showing an example of unmap by the controller 10 as one of the processing method of the storage system 4 according to the embodiment. The initial values of all bits of the first bit map 34 and the second bit map 36 are 0.

The controller 10 interprets an unmap command and obtains an unmap range and an unmap size (S12). The process of S12 corresponds to unmap command interpretation regarding one unmap command of FIG. 3 or FIG. 4.

The controller 10 determines whether or not the unmap size is greater than or equal to one Long (S14).

When the unmap size is less than one Long (S14; NO), the controller 10 determines whether or not the unmap size is greater than or equal to one Region (S16).

When the unmap size is less than one Region (S16; NO), the controller 10 sets the value of the unmap flag of the unmap range in the LUT 32 to 1 (S18). The process of S18 corresponds to unmap regarding one unmap command of FIG. 3 (the first unmap). This process disables reading of the data specified by the unmap range.

The controller 10 transmits a response to the unmap command to the host 2 (S20). The process of S20 corresponds to the transmission of a response to one unmap command to the host 2 in FIG. 3. After the process of S20, the process of the controller 10 for the unmap command ends.

When the unmap size is greater than or equal to one Long (S14; YES), the controller 10 determines whether or not the unmap size is a Long or an integer multiple of a Long (S30).

When the unmap size is a Long or an integer multiple of a Long (S30; YES), the controller 10 sets the value of a bit corresponding to a Long or an integer multiple of a Long of the unmap range in the second bit map 36 to 1 (S32). The process of S32 corresponds to the bit map registration regarding one unmap command of FIG. 4 (the second unmap).

As a result of the process of S32, the second bit map 36 is changed to, for example, the state shown in FIG. 9. FIG. 9 shows that the values of bits corresponding to an integer multiple of a Long in the second bit map 36, for example, Long [3] and Long [4], are set to 1 as a result of the process of S32.

As shown in FIG. 8, the controller 10 transmits a response to the unmap command to the host 2 (S34). The process of S34 corresponds to the transmission of a response to one unmap command to the host 2 in FIG. 4.

Subsequently, when an I/O process is not performed, the controller 10 determines whether or not the second bit map 36 stores bit 1 (S36). The controller 10 repeats the determination process of S36 until the controller 10 detects the storage of bit 1 in the second bit map 36 (S36; NO).

When the second bit map 36 stores bit 1 (S36; YES), the controller 10 sets the value of the unmap flag of the LBA range of a Long corresponding to bit 1 of the second bit map 36 in the LUT 32 to 1 (S38). The process of S38 corresponds to unmap regarding one unmap command of FIG. 4. By this process, the second unmap is performed for the unmap range of a Long or an integer multiple of a Long. The reading of the data specified by the unmapped LBAs is disabled.

After the process of S38, the process of the controller 10 for the unmap command ends.

When the unmap size is not a Long or an integer multiple of a Long (S30; NO), the controller 10 sets the value of bit corresponding to a Long or an integer multiple of a Long of the unmap range in the second bit map 36 to 1, and sets the value of the unmap flag of the remaining unmap range less than a Long in the LUT 32 to 1 (S82).

After the process of S82, the controller 10 transmits a command response to the host 2 in S34.

When the unmap size is greater than or equal to one Region (S16; YES), the controller 10 determines whether or not the unmap size is a Region or an integer multiple of a Region (S40).

When the unmap size is a Region or an integer multiple of a Region (S40; YES), the controller 10 determines whether or not the unmap range is included in an LBA range corresponding to one of the Longs in the first bit map 34 (S42).

When the unmap range is included in the LBA range corresponding to one of the Longs in the first bit map 34 (S42; YES), the controller 10 sets the value of a bit of a Long corresponding to the unmap range in the first bit map 34 to 1 for a Region of the unmap range (S44).

By the process of S44, the first bit map 34 is changed to, for example, the state shown in FIG. 10. FIG. 10 is a diagram for explaining the process of S44. It is assumed that the LBAs of the two Regions of the unmap range is coincident with an LBA range corresponding to bit 31*b* and bit 30*b* of Long [0] of the first bit map 34. The controller 10 changes the values of bit 31*b* and bit 30*b* of Long [0] from 0 to 1.

As shown in FIG. 7, when the unmap range is not included in the LBA range corresponding to one of the Longs of the bit map 34 (S42; NO), the controller 10 determines whether or not the first bit map 34 includes a Long in which the values of all bits are 0 (S46). A Long in which the values of all bits are 0 in the first bit map 34 is a Long which is not associated with any LBA range.

When the first bit map 34 includes a Long in which the values of all bits are 0 (S46; YES), the controller 10 associates the LBA range of one Long including the unmap range with the Long in which the values of all bits are 0, and sets the value of a bit corresponding to the unmap range of the Long to 1 for a Region of the unmap range (S48).

Figure 11:
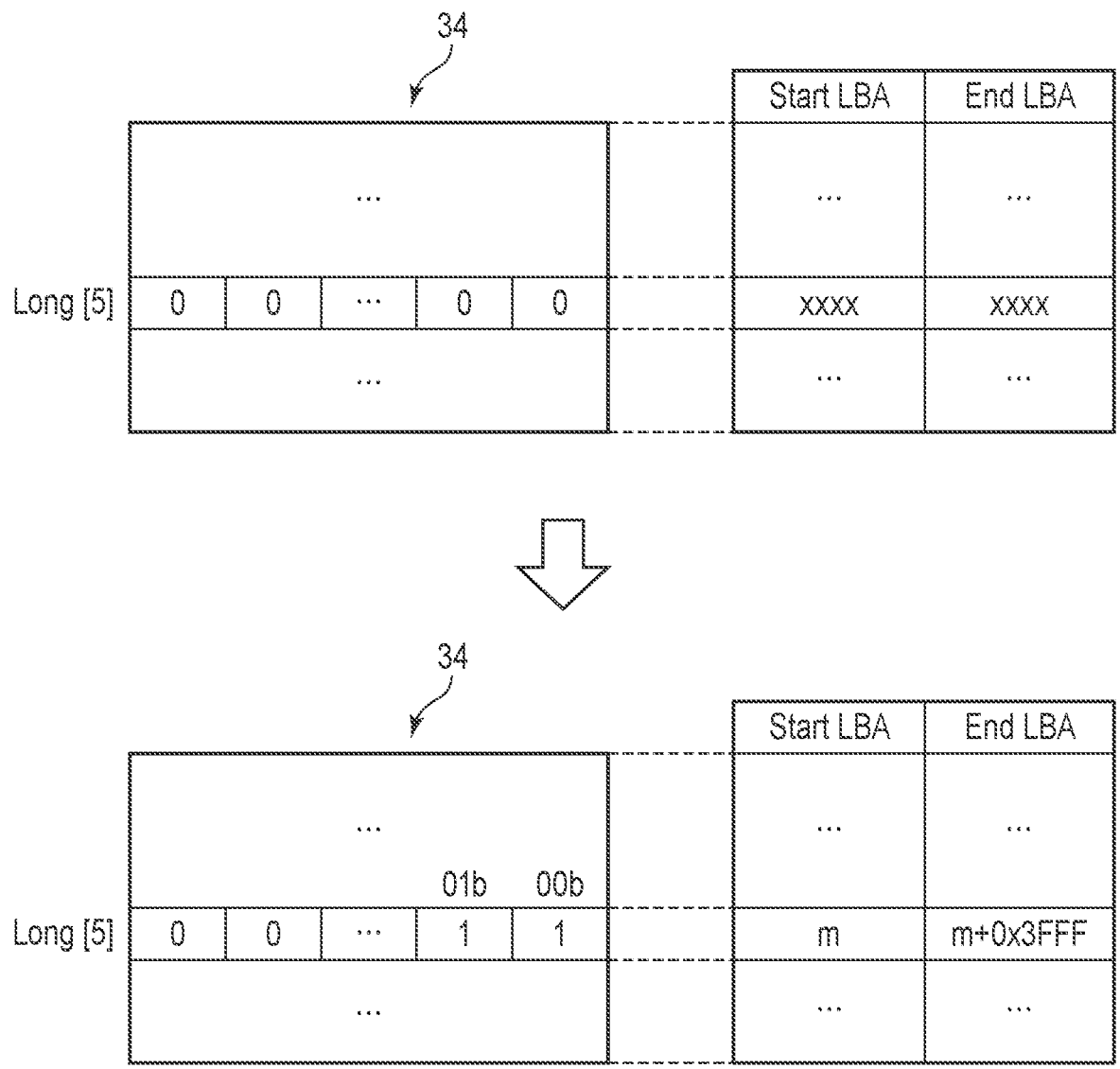
FIG. 11 shows another example of changing of the first bit map according to the embodiment.

By the process of S48, the first bit map 34 is changed to, for example, the state shown in FIG. 11. FIG. 11 is a diagram for explaining the process of S48. It is assumed that the values of all bits of Long [5] are 0, and the start LBA and the end LBA of Long [5] are invalid data XXXX. The controller 10 associates the LBA range (m to m+0x3FFF) of one Long including the unmap range with Long [5] and changes the values of bit 00*b* and bit 01*b* of Long [5] from 0 to 1.

As shown in FIG. 7, when the first bit map 34 does not include a Long in which the values of all bits are 0 (S46; NO), the controller 10 unmaps a Region of a Long of the first bit map 34 and changes the value of a bit of the first bit map 34 corresponding to the Region in which the unmap is completed to 0. In other words, the controller 10 changes the values of all bits of a Long in the first bit map 34 to 0, and invalidates the start LBA and the end LBA of the Long (S50). At this time, the controller 10 selects a Long in which the number of registrations of bit 1 is less (less than or equal to a certain number or relatively less) and unmaps a Region corresponding to bit 1. In a Long in which the number of registrations of bit 1 is less, the number of Regions which should be unmapped to set the values of all bits to 0 is less. Thus, the values of all bits of a Long of the first bit map 34 are expected to be 0 at short times. The controller 10 may select the Long in which the number of registrations of bit 1 is the minimum.

Figure 12:
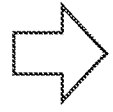
FIG. 12 shows a still another example of changing of the first bit map according to the embodiment.

By the process of S50, the first bit map 34 is changed to, for example, the state shown in FIG. 12. FIG. 12 is a diagram for explaining the process of S50. The number of registrations of bit 1 of Long [0] is assumed to be one. The number of registrations of bit 1 of Long [1] is assumed to be two. The number of registrations of bit 1 of Long [5] is assumed to be 31. The number of registrations of bit 1 of Long [9] is assumed to be 20. The controller 10 unmaps one Region corresponding to bit 01*b* representing bit 1 in Long [0] in which the number of registrations of bit 1 is the minimum. After unmapping the Region, the controller 10 changes the value of bit 01*b* of Long [0] to 0 and causes the start LBA and the end LBA of Long [0] to be invalid data XXXX. The values of all bits of Long [0] are set to 0, and the number of registrations of bit 1 of Long [0] is zero. By this operation, the first bit map 34 transitions from a state which does not include a Long in which the values of all bits are 0 to a state which includes a Long in which the values of all bits are 0 at short times.

Subsequently, as shown in FIG. 7, the controller 10 associates the LBA range of one Long including the unmap range with Long [0] which is generated by the process of S50 and in which the values of all bits are 0, and sets the value of a bit corresponding to the unmap range of Long [0] to 1 for a Region of the unmap range (S52).

After the processes of S44, S48, or S52, the controller 10 determines whether or not the first bit map 34 includes a Long in which the values of all bits are 1 (S60).

When the first bit map 34 includes a Long in which the values of all bits are 1 (S60; YES), the controller 10 sets the value of a bit corresponding to the Long in the second bit map 36 to 1. The controller 10 changes the values of all bits of the Long in the first bit map 34 to 0 and invalidates the start LBA and the end LBA of the Long (S62).

Figure 13:
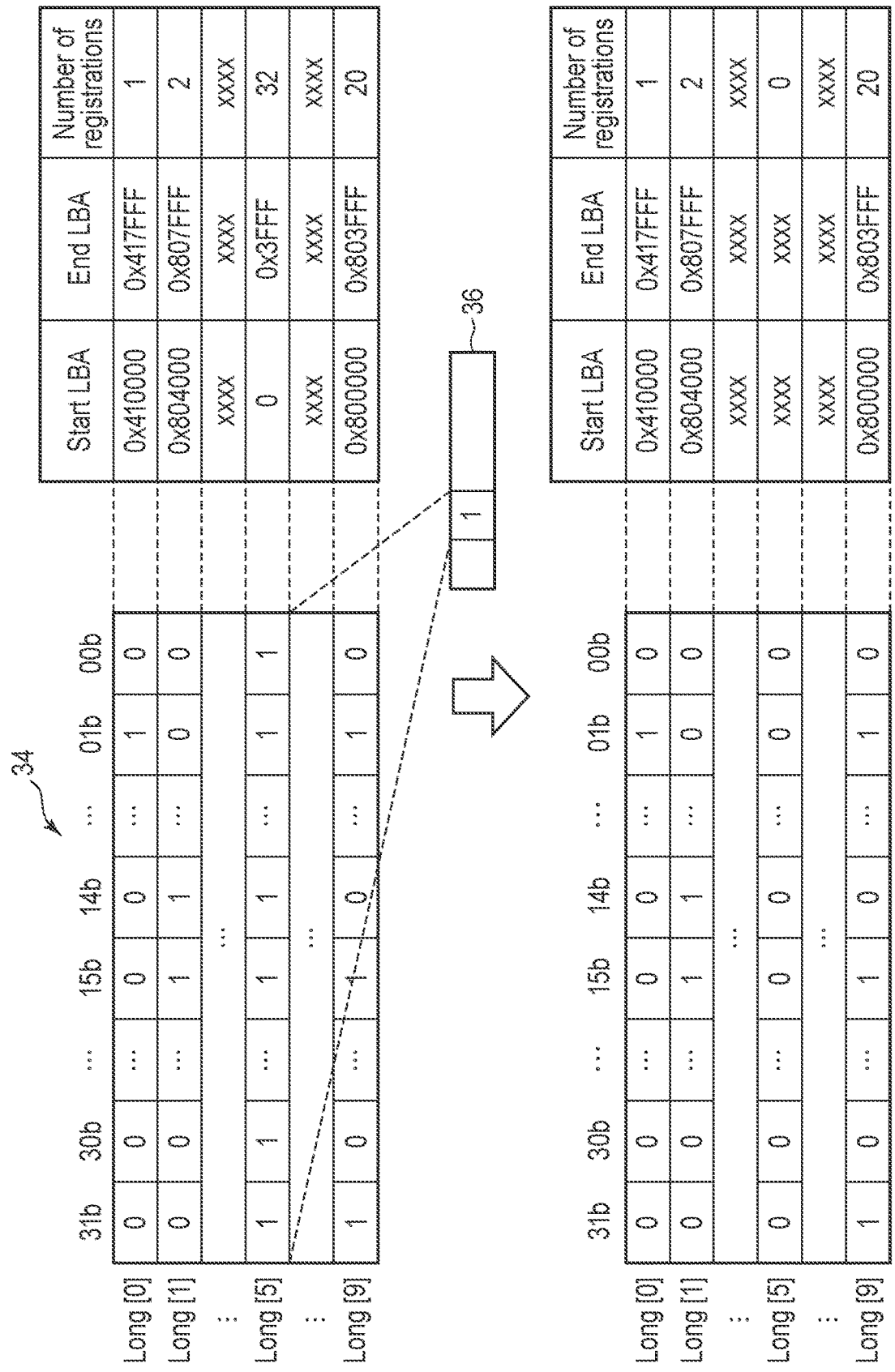
FIG. 13 shows a further example of changing of the first bit map according to the embodiment.

By the process of S62, the first bit map 34 and the second bit map 36 transition to, for example, the state shown in FIG. 13. FIG. 13 is a diagram for explaining the process of S62. It is assumed that the values of all bits of Long [5] are 1. The controller 10 changes the values of all bits of Long [5] in the first bit map 34 from 1 to 0 and causes the start LBA and the end LBA of Long [5] to be invalid data xxxx. The controller 10 sets the value of a bit corresponding to Long [5] in the first bit map 36 to 1.

As shown in FIG. 8, after the process of S62, the controller 10 transmits a command response to the host 2 in S34.

When the unmap size is not greater than or equal to one Region (S40; NO), the controller 10 sets the value of a bit corresponding to a Region or an integer multiple of a Region of the unmap range in the first bit map 34 to 1, and sets the value of the unmap flag of the remaining unmap range less than one Region in the LUT 32 to 1 (S84).

After the process of S84, the controller 10 performs the determination process of S60.

When the first bit map 34 does not include a Long in which the values of all bits are 1 (S60; NO), the controller 10 transmits a command response to the host 2 (S34).

Figure 14:
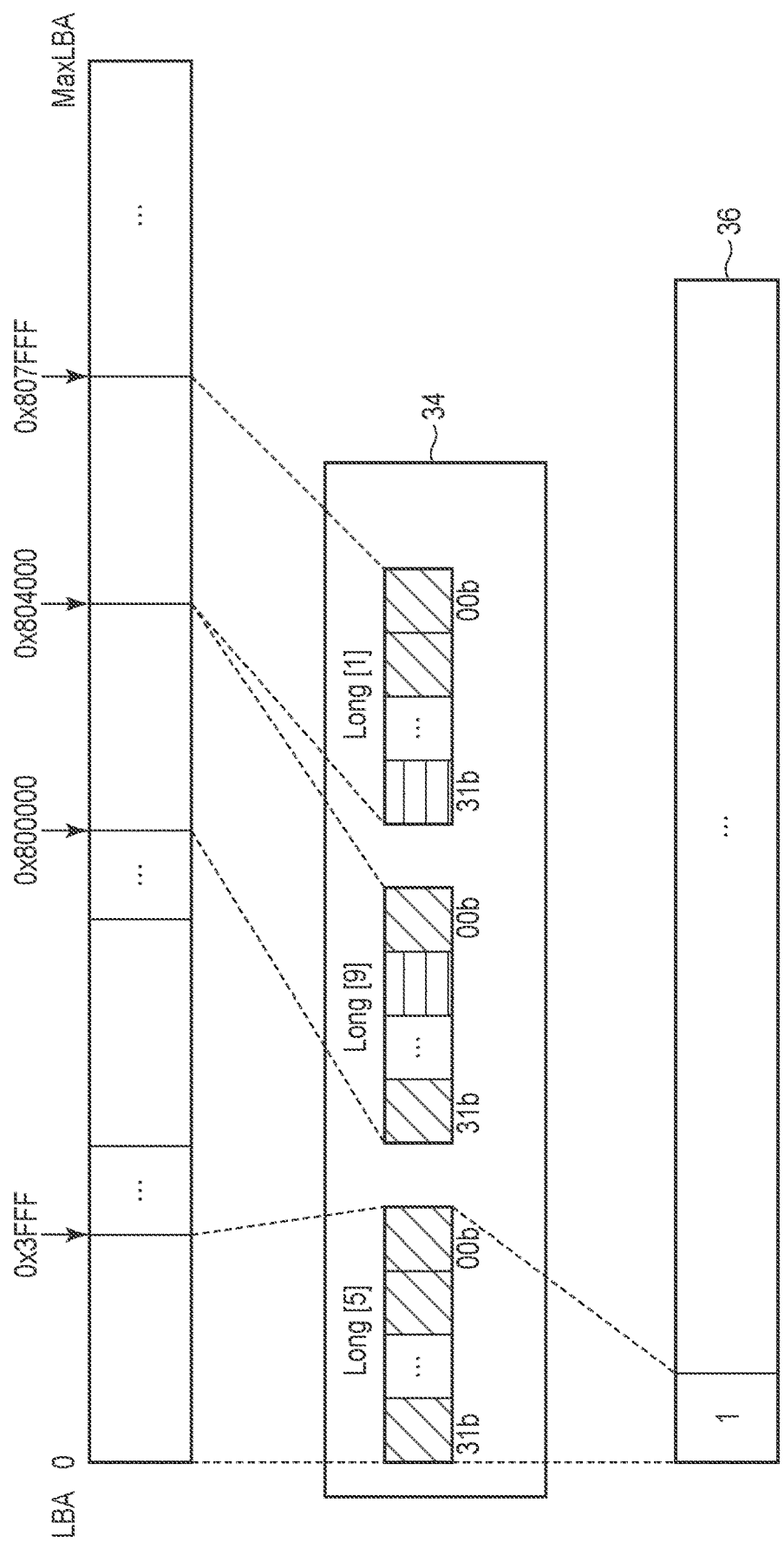
FIG. 14 is a diagram for explaining an effect of the first bit map and the second bit map according to the embodiment.

FIG. 14 is a diagram for explaining the effect of the first bit map 34 and the second bit map 36 according to the embodiment. The LBA range from 0 to 0x3FFF is associated with Long [5]. The LBA range from 0x800000 to 0x803FFF is associated with Long [9]. The LBA range from 0x804000 to 0x807FFF is associated with Long [1]. In each Long, each of bits with hatch lines indicates bit 1. Each of bits with horizontal lines indicates bit 0. Each of white bits indicates an indefinite bit (in other words, each of bits may be either bit 1 or bit 0).

In Long [5], when the white bit is bit 1, every bit is bit 1. Thus, in the second bit map 36, a bit corresponding to an LBA range corresponding to Long [5] is set to bit 1. Subsequently, all bits of Long [5] are changed to bits 0.

When the unmap range included in the unmap command is included in an LBA range corresponding to Long [9] or Long [1], in Long [9] or Long [1], a bit corresponding to the Region to be unmapped is set to bit 1.

In the processes of FIG. 6, FIG. 7 and FIG. 8, when the unmap size is greater than or equal to one Long, the controller 10 registers information indicating the state of the unmap range with the second bit map 36 and transmits a command response to the host 2. Subsequently, the controller 10 sets the value of the unmap flag of the unmap range in the LUT 32 to 1. When the unmap size is less than one Long and greater than or equal to one Region, the controller 10 registers information indicating the state of the unmap range with the first bit map 34 and transmits a command response to the host 2.

When information indicating the state of the unmap range is registered with all bits of a Long of the first bit map 34, the controller 10 registers information indicating the state of the unmap range corresponding to the Long with the second bit map 36. In this way, information indicating the state of the unmap range less than one Long is also registered to the first bit map 34. Therefore, even if the unmap size is less than one Long, a command response is transmitted to the host 2 before unmap. Thus, an unmap process is performed at high speed.

When the first bit map 34 does not include a Long in which the values of all bits are 0, in other words, when a Long for registering information indicating the state of the unmap range is not present, the controller 10 unmaps a Region corresponding to bit 1 of the Long in which the number of registrations of bit 1 is the minimum, and changes the values of all bits of one of the Longs of the first bit map 34 to 0.

Now, this specification explains a modification of the above process of unmapping a Region corresponding to one of the Longs of the first bit map 34 and changing the values of all bits of the one of the Longs of the first bit map 34 to 0. FIG. 15 is a flowchart showing a process of the modification by the controller 10 according to the modification.

The controller 10 determines whether or not the process is in the middle of an I/O process such as read access or write access (S102). The controller 10 repeats the determination process of S102 until the controller 10 detects that the process is not in the middle of an I/O process (S102; YES).

When the process is not in the middle of an I/O process (S102; NO), the controller 10 determines whether or not a certain time elapsed after the termination of the previous I/O process (S104).

When a certain time does not elapse after the termination of the previous I/O process (S104; NO), the controller 10 performs the determination process of S102 again.

When a certain time elapsed after the termination of the previous I/O process (S104; YES), the controller 10 unmaps a Region corresponding to bit 1 of a Long in which the number of registrations of bit 1 is greater than or equal to a certain number in the first bit map 34 (S106). The controller 10 may unmap a Region corresponding to bit 1 of a Long in which the number of registrations of bit 1 is the maximum.

For example, when the state of the first bit map 34 is the state shown in FIG. 12, the controller 10 unmaps 31 Regions corresponding to bits 1 of Long [5] in which the number of registrations of bit 1 is the maximum. When a certain time elapsed after the termination of the previous I/O process, it is considered that the host 2 does not transmit an I/O command to the SSD 4 for a certain time. Thus, it is considered that there is no problem even if a large number of Regions are unmapped. When the 31 Regions are unmapped, the values of all bits of Long [5] are 0.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as would fall within the scope and spirit of the inventions.

What is claimed is:

1. A storage system comprising:
   a nonvolatile storage medium;
   a volatile memory; and
   a controller, wherein
   the volatile memory comprises:
     a first area;
     a second area; and
     a third area;
   the first area is configured to store a logical address specified by an external device, a physical address of the nonvolatile storage medium associated with the logical address, and first information related to association between the logical address and the physical address;
   the second area is configured to store second information indicating states of a first number of first ranges of the logical address;
   the third area is configured to store third information indicating a state of a second range of the logical address, the second range including the first number of the first ranges;
   a value of the first information is a first value when the physical address is associated with the logical address;
   the value of the first information is a second value different from the first value when the physical address is not associated with the logical address;
   the controller is configured to:
     write the third information to the third area based on the second information; and
     set a value of the first information related to association between the logical address and the physical address in the second range to the second value based on the third information,
   each of the first ranges has a first size;
   the second range has a second size greater than the first size; and
   the controller is further configured to:
     receive a first command specifying a first logical address range from the external device;
     write the third information related to the second range in the first logical address range to the third area when a size of the first logical address range is greater than or equal to the second size; and
     write the second information related to the first ranges in the first logical address range to the second area when the size of the first logical address range is less than the second size and greater than or equal to the first size.

2. The storage system of claim 1, wherein
   the controller is further configured to:
     write the third information related to the second range in the first logical address range to the third area; and
     transmit a response to the first command to the external device.

3. The storage system of claim 2, wherein
   the controller is further configured to transmit the response to the external device before setting the value of the first information.

4. The storage system of claim 1, wherein
   the second area comprises a plurality of subareas;
   the subareas are able to be associated with different second ranges;
   each of the subareas is able to store second information indicating states of the first number of first ranges included in a second range associated with the each of the subareas; and
   the controller is further configured to write third information indicating a state of a second range associated with a first one of the subareas to the third area when a number of states indicated as the second information stored in the first one of the subareas is the first number.

5. The storage system of claim 4, wherein
the controller is further configured to set values of the first information related to logical addresses of the first ranges in the first area to the second value based on the second information stored in the first one of the subareas.

6. The storage system of claim 5, wherein
the controller is further configured to set values of the first information related to logical addresses of the first ranges in the first area to the second value based on the second information stored in a subarea in which a number of stored second information items is less than or equal to a certain number.

7. The storage system of claim 5, wherein
the controller is further configured to set values of the first information related to logical addresses of the first ranges in the first area to the second value based on the second information stored in a subarea in which a minimum number of second information items is stored.

8. The storage system of claim 5, wherein
the controller is further configured to set values of the first information related to logical addresses of the first ranges in the first area to the second value based on the second information stored in a subarea in which a number of stored second information items is greater than or equal to a certain number when the nonvolatile storage medium does not have read access or write access for a certain period.

9. The storage system of claim 5, wherein
the controller is further configured to set values of the first information related to logical addresses of the first ranges in the first area to the second value based on the second information stored in a subarea in which a maximum number of second information items is stored when the nonvolatile storage medium does not have read access or write access for a certain period.

10. The storage system of claim 1, wherein
the controller is further configured to:
read the physical address associated with the logical address from the first area and read data from the physical address of the nonvolatile storage medium, or
when data corresponding to a first logical address is written to a first physical address of the nonvolatile storage medium, write the first physical address associated with the first logical address and the first information having the first value related to association between the first logical address and the first physical address to the first area.

11. The storage system of claim 1, wherein the nonvolatile storage medium includes a NAND flash memory.

12. A processing method of a storage system comprising a nonvolatile storage medium and a volatile memory, wherein
the volatile memory comprises:
a first area;
a second area; and
a third area;
the first area is configured to store a logical address specified by an external device, a physical address of the nonvolatile storage medium associated with the logical address, and first information related to association between the logical address and the physical address;
the second area is configured to store second information indicating states of a first number of first ranges of the logical address;
the third area is configured to store third information indicating a state of a second range of the logical address, the second range including the first number of the first ranges;
a value of the first information is a first value when the physical address is associated with the logical address;
the value of the first information is a second value different from the first value when the physical address is not associated with the logical address,
the processing method comprises:
writing the third information to the third area based on the second information; and
setting a value of the first information related to association between the logical address and the physical address in the second range to the second value based on the third information, wherein
each of the first ranges has a first size; and
the second range has a second size greater than the first size; and the processing method further comprising:
receiving a first command specifying a first logical address range from the external device;
writing the third information related to the second range in the first logical address range to the third area when a size of the first logical address range is greater than or equal to the second size; and
writing the second information related to the first ranges in the first logical address range to the second area when the size of the first logical address range is less than the second size and greater than or equal to the first size.

13. The processing method of claim 12, further comprising:
writing the third information related to the second range in the first logical address range to the third area; and
transmitting a response to the first command to the external device.

14. The processing method of claim 13, further comprising:
transmitting the response to the external device before setting the value of the first information.

15. The processing method of claim 12, wherein
the second area comprises a plurality of subareas;
the subareas are able to be associated with different second ranges;
each of the subareas is able to store second information indicating states of the first number of first ranges included in a second range associated with the each of the subareas; and the processing method further comprising:
writing third information indicating a state of a second range associated with a first one of the subareas to the third area when a number of states indicated as the second information stored in the first one of the subareas is the first number.

16. The processing method of claim 15, further comprising:
setting values of the first information related to logical addresses of the first ranges in the first area to the second value based on the second information stored in the first one of the subareas.

17. The processing method of claim 16, further comprising:
setting values of the first information related to the logical addresses of the first ranges in the first area to the second value based on the second information stored in a subarea in which a number of stored second information items is less than or equal to a certain number or a subarea in which a minimum number of second information items is stored.

18. The processing method of claim 16, further comprising:

setting values of the first information related to logical addresses of the first ranges in the first area to the second value based on the second information stored in a subarea in which a number of stored second information items is greater than or equal to a certain number or a subarea in which a maximum number of second information items is stored when the nonvolatile storage medium does not have read access or write access for a certain period.

19. The processing method of claim 12, further comprising:

reading the physical address associated with the logical address from the first area and read data from the physical address of the nonvolatile storage medium, or when data corresponding to a first logical address is written to a first physical address of the nonvolatile storage medium, writing the first physical address associated with the first logical address and the first information having the first value related to association between the first logical address and the first physical address to the first area.

20. The processing method of claim 12, wherein the nonvolatile storage medium comprises a NAND flash memory.

* * * * *